C. M. Sturgess,
Harness Saddle,
Nº 61,891. Patented Feb. 5, 1867.
Fig. 1.
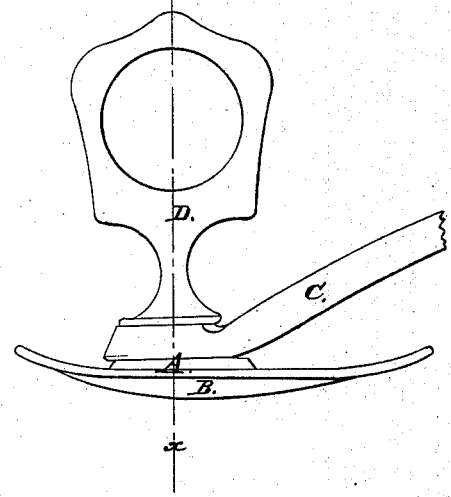
Fig. 2.
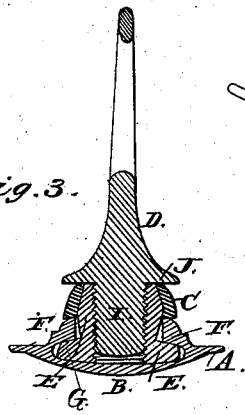
Fig. 3.
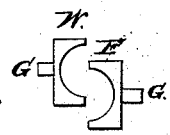
Witnesses.
Geo. L. Chapin.
A. Waynall
Inventor:
C. M. Sturgess,
By his Attorney
Geo. L. Chapin

United States Patent Office.

CHARLES M. STURGESS, OF WASHINGTON, IOWA.

Letters Patent No. 61,891, dated February 5, 1867.

---

IMPROVEMENT IN HARNESS-TREES.

---

*The Schedule referred to in these Letters Patent and making part of the same.*

---

TO ALL WHOM IT MAY CONCERN:

Be it known that I, CHARLES M. STURGESS, of Washington, in the county of Washington, and State of Iowa, have invented a new and useful Improvement in Self-Adjusting Harness-Trees; and I do hereby declare that the following is a full, clear, and exact description of the construction and operation of the same, reference being had to the annexed drawings and letters of reference marked thereon, making part of this specification, in which—

Figure 1 is a two-part nut to which the terret is attached.

Figure 2 is a longitudinal elevation of one-half of the adjustable tree.

Figure 3 is a sectional elevation of the tree taken through the line X X.

The nature of my invention consists in the use of a two-part nut, fitted into the pad-tree in such a manner that no opening is required in the under side of the pad-tree for inserting the nut. By this arrangement much expense is saved in the construction of the pad, for no plate is required to hold the nut in position. The usual method of construction is to make an opening through the back of the pad plate for the purpose of inserting the nut which holds the terret, and then securing a plate over said opening by means of rivets. When the two-part nut is used, the back plate is not necessary, for the pad plate can be cast so as to receive the nut and hold it in position. By the use of my invention, the shank of a broken terret—on which is made the screw—can be removed readily, without the usual resort to drilling, or otherwise destroying the pad or pad plate; which is not the case when adjustable trees are used, as now manufactured.

To enable others skilled in the art to make and use my invention, I will describe its construction and operation.

A represents the common pad-tree, to which the pad is attached in the usual manner. E E shows the nut, which is made in two parts, as seen at fig. 1, and has the nibs G passing under the projections F, in order that the nut to which the nibs are attached may be held firmly in position, and yet allow the yoke to be self-adjusting to the back of the horse. C shows one-half of the yoke, the lower end of which is fitted over the upper part of the nut E E, and between the base J of the terret D and the projections F on the pad plate, by which means it is held in position for use and adjustment. I is the shank of the terret as inserted in the nut E E, as seen at fig. 3, and can be easily removed when broken off at the base J. The whole arrangement, except the two-part nut E E, is similar to the common adjustable tree now in use, and is intended to answer the same purpose.

*Operation.*

No skill is required in the use of my invention except inserting the nut E E, which can be put in the pad-tree A by moving the parts E E past each other, as seen by the plan view W, and then adjust them in position for receiving the screw I, as seen at fig. 1.

Having thus fully described my device, I do not claim the parts C D A, but what I do claim, and desire to secure by Letters Patent of the United States, is—

The combination of the two-part nut E E, pad-tree A, and yoke C, substantially as and for the purpose set forth

C. M. STURGESS.

Witnesses:
 GEO. L. CHAPIN,
 A. HAYWARD.

\* Ass'or to Self & John C. Woolley of Chicago, Illinois.